United States Patent
Barkan et al.

(10) Patent No.: US 11,783,681 B2
(45) Date of Patent: *Oct. 10, 2023

(54) BIOPTICAL BARCODE READER

(71) Applicant: SYMBOL TECHNOLOGIES, LLC, Holtsville, NY (US)

(72) Inventors: Edward Barkan, Miller Place, NY (US); Mark Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/526,637

(22) Filed: Nov. 15, 2021

(65) Prior Publication Data
US 2022/0076545 A1 Mar. 10, 2022

Related U.S. Application Data

(63) Continuation of application No. 16/665,952, filed on Oct. 28, 2019, now Pat. No. 11,200,785, which is a continuation of application No. 14/709,603, filed on May 12, 2015, now Pat. No. 10,460,574.

(51) Int. Cl.
| | | |
|---|---|---|
| H04N 7/18 | (2006.01) |
| G06K 7/10 | (2006.01) |
| G07G 1/00 | (2006.01) |
| G07G 1/12 | (2006.01) |
| G06Q 20/20 | (2012.01) |
| H04N 5/77 | (2006.01) |
| G06Q 20/40 | (2012.01) |
| G06V 20/52 | (2022.01) |
| G06V 40/20 | (2022.01) |

(52) U.S. Cl.
CPC ......... *G07G 1/0054* (2013.01); *G06Q 20/208* (2013.01); *G06Q 20/4014* (2013.01); *G06V 20/52* (2022.01); *G06V 40/28* (2022.01); *G07G 1/0009* (2013.01); *G07G 1/12* (2013.01); *H04N 5/77* (2013.01)

(58) Field of Classification Search
CPC ...... G07G 1/0054; G07G 1/0009; G07G 1/12; G06Q 20/208; G06Q 20/4014; G06V 20/52; G06V 40/28; H04N 5/77
See application file for complete search history.

(56) References Cited

U.S. PATENT DOCUMENTS

| | | | |
|---|---|---|---|
| 8,727,218 B1 * | 5/2014 | Handshaw | G07G 1/0018 235/440 |
| 2004/0111324 A1 * | 6/2004 | Kim | G06Q 20/203 705/22 |
| 2005/0269405 A1 * | 12/2005 | Throckmorton | G07G 1/14 235/383 |
| 2007/0145117 A1 * | 6/2007 | Throckmorton | G07G 1/14 348/150 |

(Continued)

*Primary Examiner* — Talia F Crawley
(74) *Attorney, Agent, or Firm* — Yuri Astvatsaturov

(57) ABSTRACT

A workstation captures images of illuminated symbols with a solid-state imager. In an embodiment, the workstation includes a removable camera module in the workstation away from the imager. The camera module captures a secondary image through a window. The captured image of the illuminated symbol and the captured secondary image are independently processed.

10 Claims, 6 Drawing Sheets

(56) References Cited

U.S. PATENT DOCUMENTS

| | | | | |
|---|---|---|---|---|
| 2009/0115849 A1* | 5/2009 | Landers, Jr. | ..... | G08B 13/19613 348/E7.001 |
| 2010/0002902 A1* | 1/2010 | Landers, Jr. | ............. | G07G 1/14 382/209 |
| 2011/0063108 A1* | 3/2011 | Aonuma | ............ | G06Q 20/4016 340/540 |
| 2012/0150589 A1* | 6/2012 | Xian | .................... | G07G 1/0045 705/7.42 |
| 2012/0187191 A1* | 7/2012 | Olmstead | ........... | G06K 7/10861 235/462.13 |
| 2014/0160293 A1* | 6/2014 | Ristivojevic | ........... | G06Q 20/20 348/150 |
| 2015/0199571 A1* | 7/2015 | Okuyama | ............ | G07G 1/0054 382/103 |
| 2015/0199589 A1* | 7/2015 | Suzuki | .................. | G06V 20/40 382/181 |
| 2015/0199882 A1* | 7/2015 | Fernando | ............. | G07G 1/0018 345/173 |

\* cited by examiner

BIOPTICAL BARCODE READER

CROSS-REFERENCE TO RELATED APPLICATION

This application is a continuation of U.S. patent application Ser. No. 16/665,952, filed on Oct. 28, 2019, which is a continuation of U.S. patent application Ser. No. 14/709,603, filed on May 12, 2015, both of which are incorporated herein by reference in their entirety.

BACKGROUND

The present disclosure relates generally to an arrangement for, and a method of, processing products associated with symbols to be electro-optically read by image capture at a point-of-transaction workstation, especially a dual window, bioptical workstation, and, more particularly, to upgrading the workstation with a field-installable, camera module operative for capturing an image of an operator working at the workstation, especially the operator's hands, for video surveillance purposes.

It is known to use solid-state imagers in single or dual window, point-of-transaction workstations to electro-optically read, by image capture, symbols, such as one- or two-dimensional bar code symbols associated with products to be identified and processed, e.g., purchased, at the workstations that are installed at countertops of checkout stands in supermarkets, warehouse clubs, department stores, and other kinds of retailers. The products are typically slid or moved by an operator across, or presented to and momentarily held steady at a central region of, a generally horizontal window that is mounted in a horizontal platform of a workstation and that faces upwardly above a countertop, and/or a generally vertical or upright window that is mounted in a raised vertical tower of the workstation and that faces the user. The known workstations utilize illumination light assemblies to illuminate the symbols, and multiple mirror assemblies to direct return illumination light from the products through one or both windows to one or more imagers along multiple, intersecting fields of view, or narrow subfields, that pass through the windows along different directions in order to provide each workstation with a full coverage scan zone that extends above the horizontal window and in front of the upright window as close as possible to the countertop, and extends sufficiently high above the countertop, and extends as wide as possible across the width of the countertop, to enable reliable reading of a symbol that could be positioned anywhere on all six sides of a three-dimensional product.

Many retailers wish to prevent the unauthorized giving-away of products by a workstation operator to a "sweetheart" customer, e.g., a friend, a family member, a fellow employee, etc., for example, by scan avoidance, price overrides, and refund/gift card/void fraud during checkout at the known workstations. To reduce or prevent "sweethearting" losses, retailers typically employ security guards to check customer receipts at retail store exits. To reduce or avoid such security expenses, some retailers have attempted to employ at least one of the solid-state imagers associated with the upright window, which is already present in the known workstations, with the surveillance and monitoring task of capturing images or video of the workstation operator, especially the operator's hands, during checkout.

However, although the solid-state imager associated with the upright window does have image capture capabilities, it is unsuited for this surveillance task. This imager is designed to capture an image of a symbol associated with a product in the aforementioned scan zone, and not to take a picture of the operator who is typically located forwardly beyond the scan zone. Moreover, this imager has imaging optics designed to sharply focus a captured symbol image in the aforementioned scan zone, whereas a picture of an operator who is typically located beyond the scan zone will be unfocused. Furthermore, this imager uses short exposure times to freeze the motion of moving symbols, and, if used to take the operator's picture, may cause the picture to not be ideally exposed. In addition, this imager is associated with an illuminator that directs bright, pulsed illumination light to illuminate the symbol. If such bright, pulsed illumination light were directed to the operator, it would be highly objectionable, especially when repeated frequently over the course of a workday. Still further, as noted above, this imager is associated with a mirror assembly that is designed to capture the return light from the illuminated symbol over multiple, narrow subfields extending along different directions, which is ill designed for taking a single picture of the operator over a wide field of view. Yet further, the use of this solid-state imager for surveillance adds significant cost and complexity to the workstation, which some retailers may not want to bear.

Accordingly, it would be desirable to add operator surveillance to an imager-based workstation without tasking one or more of the solid-state imagers with that monitoring responsibility, without adding significant cost and complexity to the workstation, and without repetitively annoying the operator with bright, pulsed light, and to field-upgrade the workstation with a camera module that is designed for taking a picture of the operator over a wide field of view and that is selectively installed by the retailer in the workstation only if and when desired.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
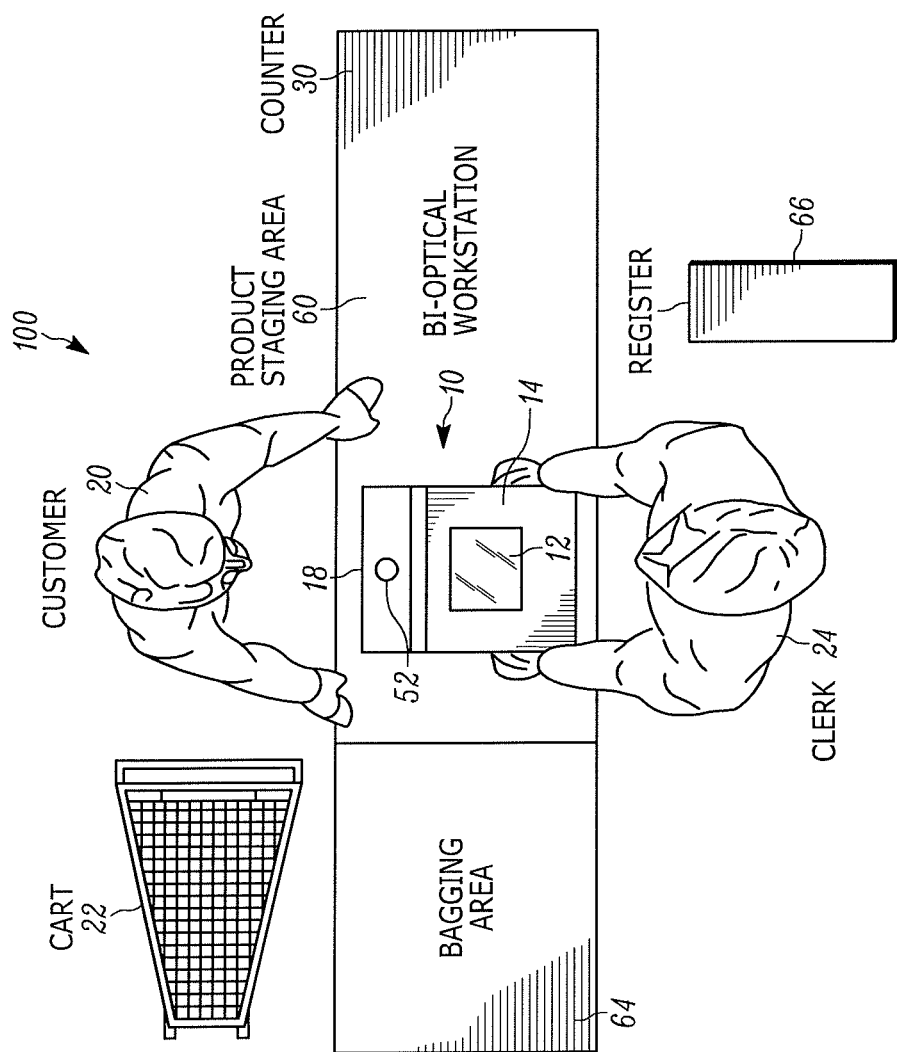
FIG. 1 is a top plan view of a retail checkout system having a field-upgradeable, dual window, bioptical workstation that performs operator surveillance in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a point-of-transaction arrangement for processing products associated with symbols. The arrangement includes a housing having an upright window located in an upright plane. The upright window faces a scan zone in which a product is presented by an operator for processing. Advantageously, the housing is a bioptical workstation having a horizontal window lying in a horizontal plane that intersects the upright plane, in which case, both the windows bound the scan zone in which the product is presented. The arrangement also includes an illuminating assembly supported by the housing, and operative for illuminating a symbol associated with the product in the scan zone. An imaging assembly is also supported by the housing for capturing an image of the illuminated symbol. The imaging assembly includes a solid-state imager having an array of image sensors with a field of view in which return illumination light from the illuminated symbol passes through and past the upright window to the imager. A camera module, preferably field-installable, is mounted in the housing away from the imager. The camera module captures an image of the operator, especially the operator's hands, through the upright window. A controller is operatively connected to, and controls, the illuminating assembly, the imager, and the camera module, and is operative for independently processing the captured image of the illuminated symbol and the captured image of the operator.

In a preferred embodiment, the controller controls and energizes the illuminating assembly to illuminate the symbol with illumination light during illumination time periods that are spaced apart by time intervals from each other, and controls and deenergizes the illuminating assembly to emit no illumination light during the time intervals. In this event, the controller controls the camera module to capture the image of the operator only during the time intervals with no illumination light. Thus, the camera module captures the image of the operator using only ambient light. Advantageously, the controller controls the camera module to capture the image of the operator only during the time intervals after a predetermined number of illumination time periods have elapsed. A manual actuator could alternatively be used for manually deactivating the illuminating assembly, and for concomitantly actuating the camera module to capture the image of the operator.

To field-install the camera module, the housing has a removable housing portion, and the camera module is mounted inside the housing after removal of the housing portion. Advantageously, the camera module includes a printed circuit board, a camera on the board, and a transmitter on the board for transmitting the captured image of the operator to a remote host.

Another aspect of this disclosure relates to a method of processing products associated with symbols. The method is performed by having the operator present a product for processing in a scan zone faced by an upright window of a housing, by illuminating a symbol associated with the product in the scan zone, by capturing an image of the illuminated symbol over a field of view of a solid-state imager having an array of image sensors by passing return illumination light from the illuminated symbol through and past the upright window to the imager, by mounting a camera module in the housing away from the imager, by capturing an image of the operator, especially the operator's hands, through the upright window with the camera module, and by independently processing the captured image of the illuminated symbol and the captured image of the operator.

Figure 2:
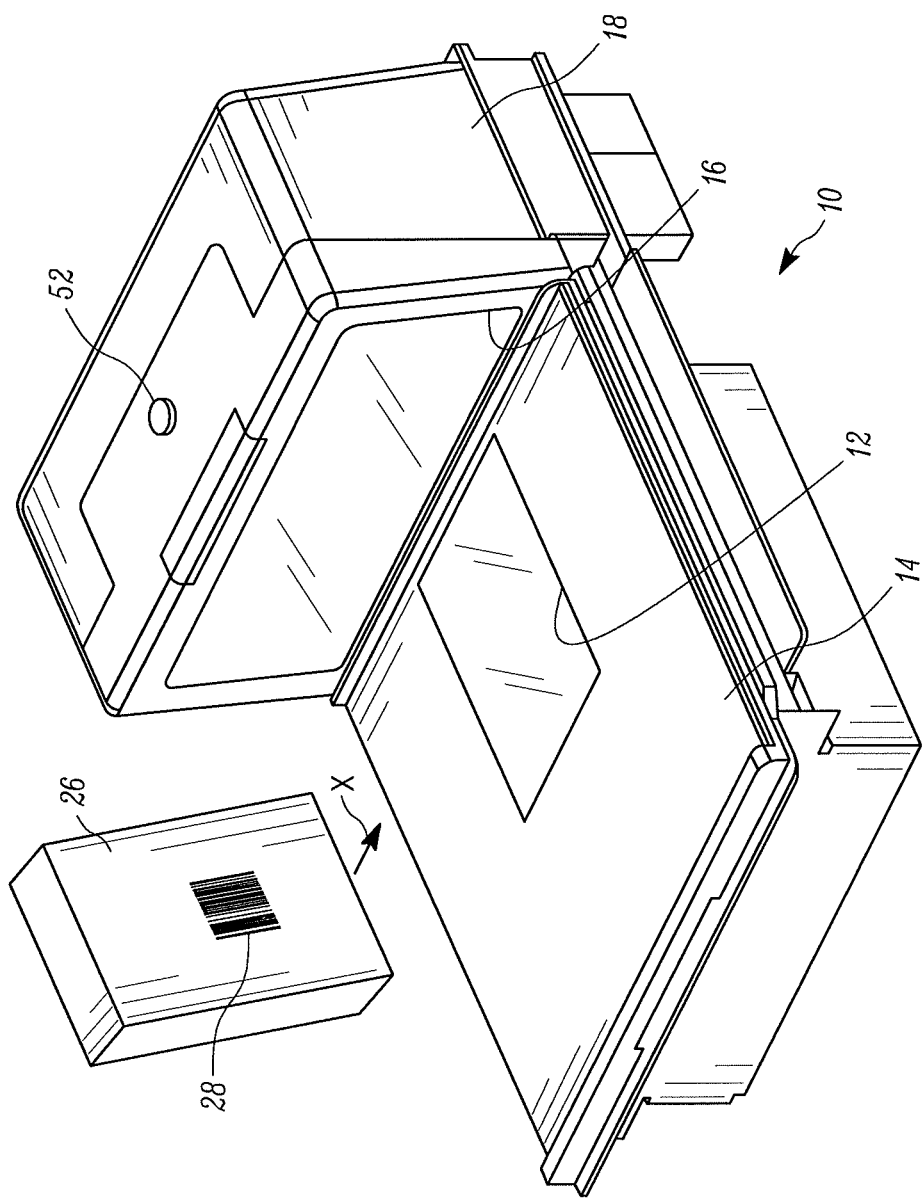
FIG. 2 is a perspective view of the workstation of FIG. 1 during electro-optical reading of a symbol on a product.
Figure 3:
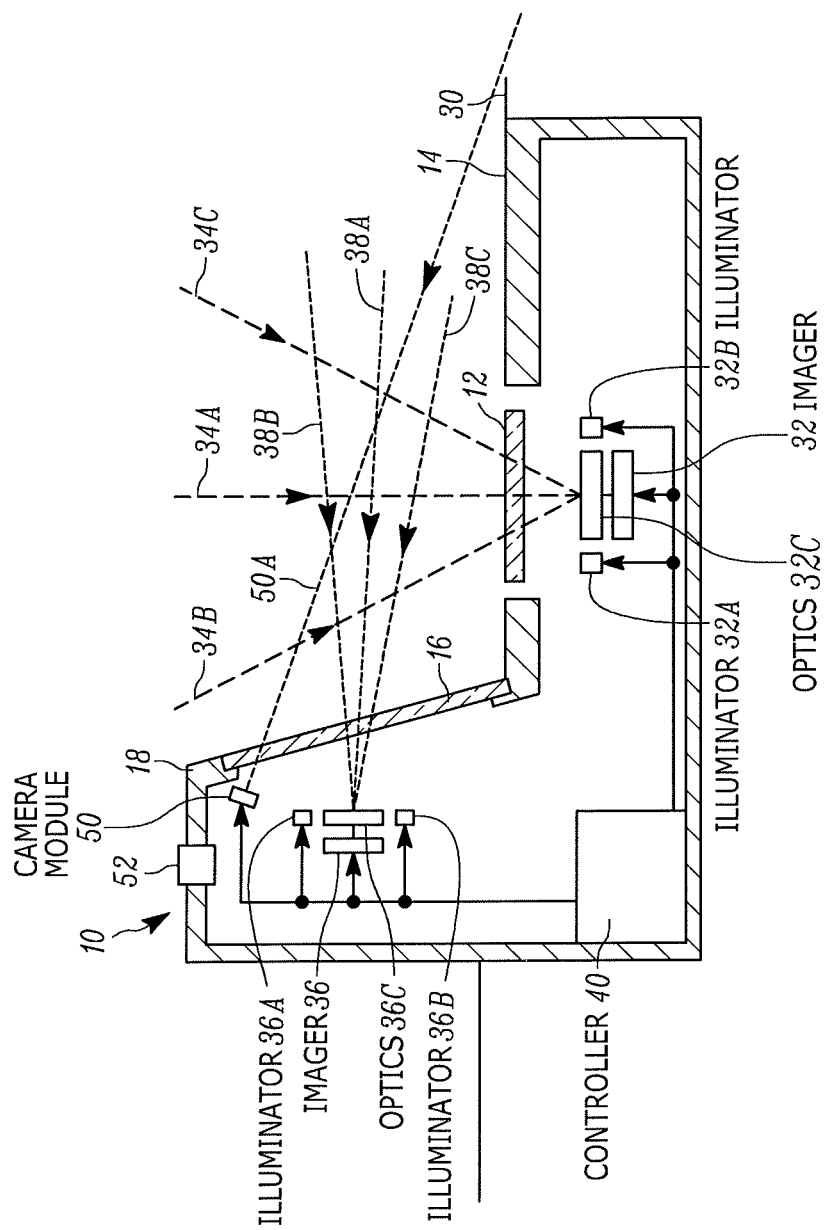
FIG. 3 is a schematic diagram of various components of the workstation of FIG. 2.
Figure 4:
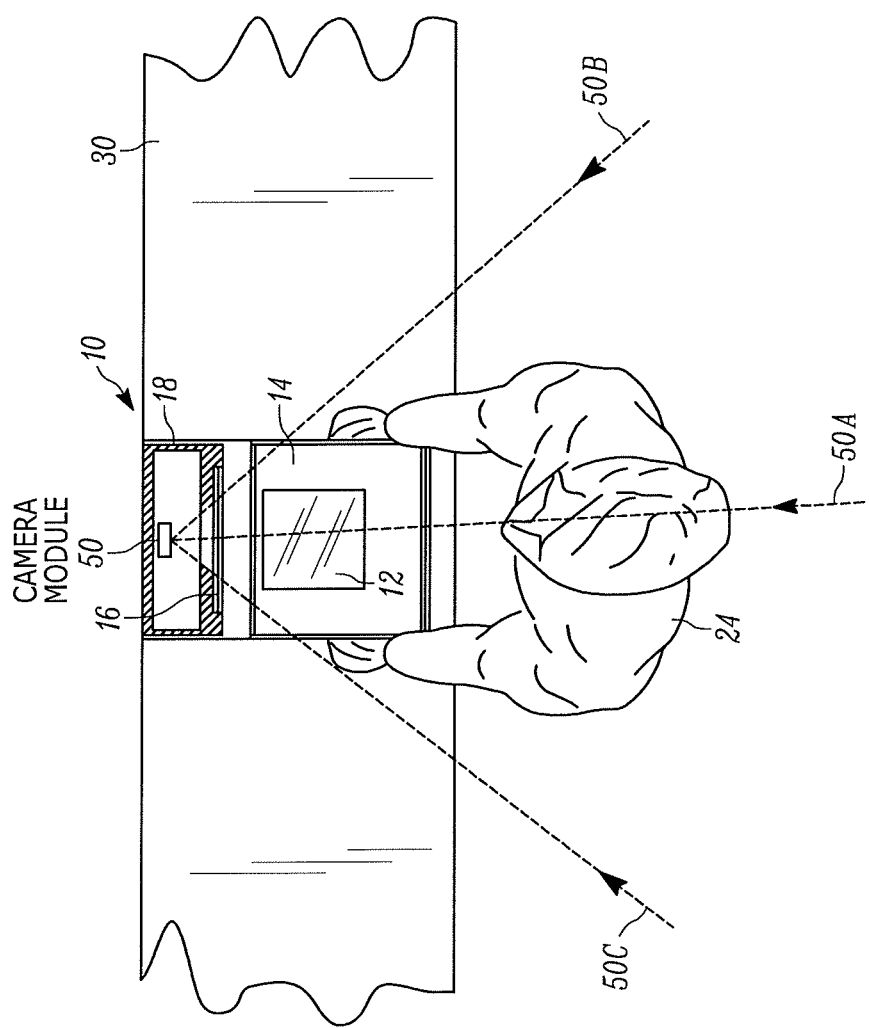
FIG. 4 is a top plan view of the workstation of FIG. 2 during operator surveillance.

Turning now to the drawings, a retail checkout system 100, as depicted in FIG. 1, includes, as shown, a dual window, bi-optical, point-of-transaction workstation 10 used by retailers at a checkout counter 30 in an aisle to process transactions involving the purchase of products 26 (see FIG. 2) bearing, or printed or associated with, an identifying symbol, such as a Universal Product Code (UPC) symbol 28. In a typical retail venue, a plurality of such workstations 10 is arranged in a plurality of checkout aisles. As best seen in FIGS. 2-3, the workstation 10 includes a housing having a generally horizontal window 12 that is located in a generally horizontal plane and that is supported by a horizontal housing portion or platform 14, and an upright window 16 that is located in a generally upright plane that intersects the generally horizontal plane and that is supported by a raised housing portion or vertical tower 18. The upright plane may lie in a vertical plane, or be slightly rearwardly or forwardly inclined relative to the vertical plane. The upright window 16 is preferably recessed within its housing portion 18 to resist scratching. By way of numerical example, the generally horizontal window 12 typically measures about four inches in width by about six inches in length, while the generally upright window 16 measures about seven inches in width by about four inches in length. The workstation 10 either rests directly on the counter 30, or preferably, as shown in FIGS. 3-4, rests in a cutout or well-formed in the counter 30.

The symbol 28 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The product 26 need not be a three-dimensional box as illustrated, but can be any object. As described below, the product 26 is slid or moved by an operator, e.g., a clerk 24 or a customer 20 (see FIG. 1), across and past the windows 12, 16 in the direction of the arrow X through the scan zone, or is presented to a central region of either window. The product 26 can be tilted or moved in other directions through the workstation 10.

Figure 5:
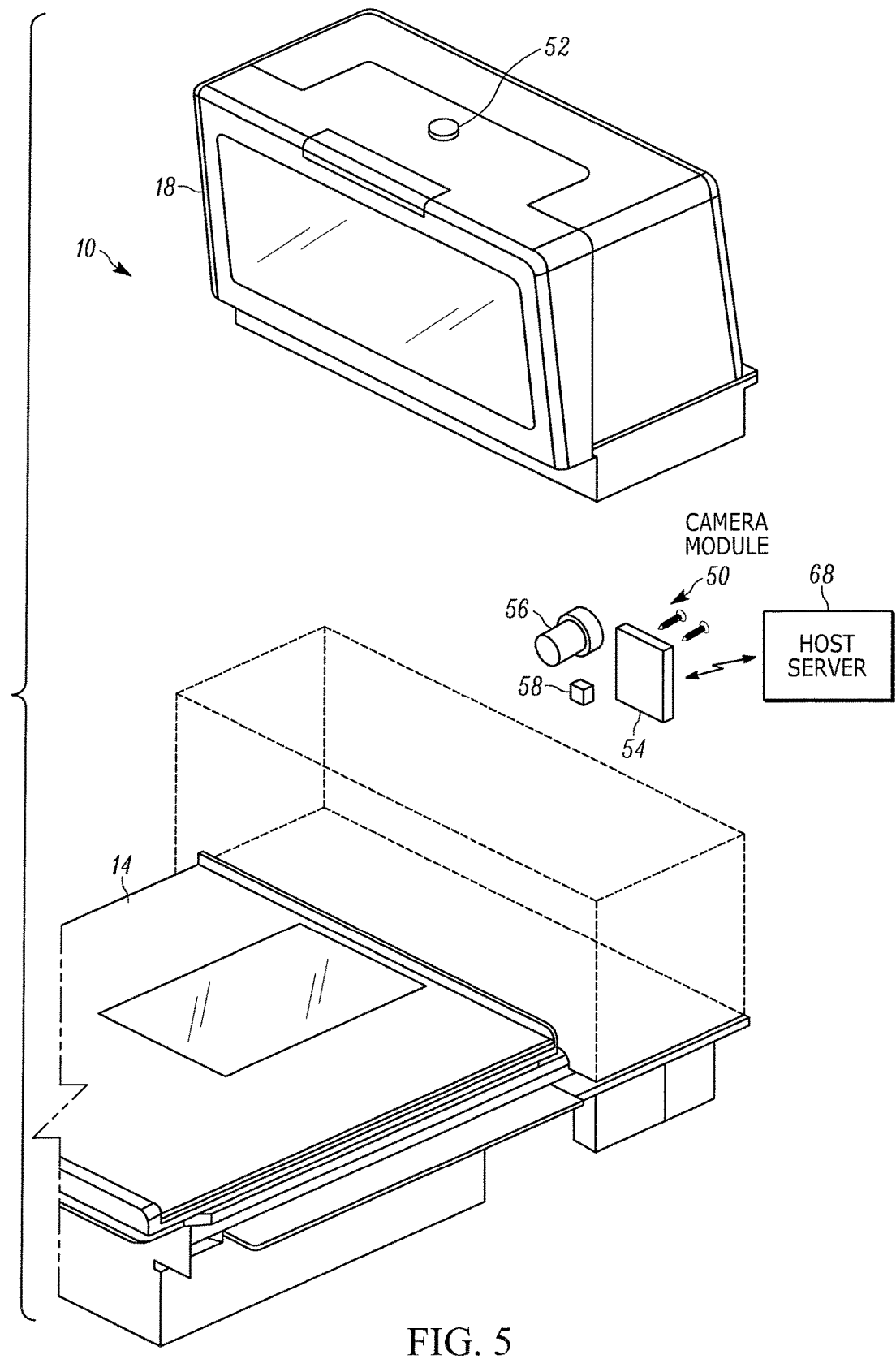
FIG. 5 is a perspective view of the workstation of FIG. 2 during a field-upgrade.

Both of the windows 12, 16 are positioned to face and be accessible to the clerk 24 (or the customer 20 in a self-checkout workstation) standing at one side of the counter 30 for enabling the clerk 24 to interact with the workstation 10, and with a cash register 66 to enable the clerk to receive payment for the purchased products. The register 66 may include a debit/credit card reader and a receipt printer to print a receipt. The workstation 10 and/or the register 66 are in wired or wireless communication with a remote host server 68 (FIG. 5). A keypad may also be provided at the register 66 to enable manual entry of information, such as an identifying code for any purchased product not bearing a symbol, by the clerk 24.

A product staging area 60 is located on the counter 30 at one side of the workstation 10. The products 26 are typically placed on the product staging area 60 by the customer 20 standing at the opposite side of the counter. The customer 20 typically retrieves the individual products for purchase from a shopping cart 22 or basket for placement on the product staging area 60. A non-illustrated conveyor belt could be employed for conveying the products 26 to the clerk 24.

As schematically shown in FIG. 3, a plurality of imaging assemblies is supported within the housing. A first imaging assembly is associated with the horizontal window 12 and includes a first, solid-state imager 32 having an array of image sensors with a field of view for capturing an image of the symbol 28. An imaging lens assembly that is internal to the first imager 32 projects the captured image onto the sensor array. A first illuminating assembly including a pair of illuminators 32A, 32B is associated with the first imager 32, for illuminating the symbol 28. A first optical assembly 32C, e.g., an arrangement of mirrors, splits the field of view of the first imager 32 into a plurality of intersecting subfields of view along which return illumination light from the illuminated symbol 28 passes through and past the horizontal window 12 to the imager 32. As shown in FIG. 3, these subfields are centered on respective optical axes 34A, 34B, and 34C. It will be noted that these optical axes are generally directed upwardly away from the counter 30.

As also shown in FIG. 3, a second imaging assembly is associated with the upright window 16 and includes a second, solid-state imager 36 having an array of image sensors with a field of view for capturing an image of the symbol 28. An imaging lens assembly that is internal to the second imager 36 projects the captured image onto the sensor array. A second illuminating assembly including a pair of illuminators 36A, 36B is associated with the second imager 36, for illuminating the symbol 28. A second optical assembly 36C, e.g., an arrangement of mirrors, splits the field of view of the second imager 36 into a plurality of intersecting subfields of view along which return illumination light from the illuminated symbol 28 passes through and past the upright window 16 to the second imager 36. As shown in FIG. 3, these subfields are centered on respective optical axes 38A, 38B, and 38C. It will be noted that these optical axes are generally directed downwardly toward the counter 30.

Each imager 32, 36 preferably comprises a two-dimensional, charge coupled device (CCD) array, or a complementary metal oxide semiconductor (CMOS) array, of image sensors of megapixel size, e.g., 1280 pixels wide×960 pixels high. In a preferred embodiment, the field of view of each imager 32, 36 measures about 15 degrees by 30 degrees, and each subfield is less than these measurements. Each illuminator 32A, 32B, 36A, 36B is preferably one or more light sources, e.g., one or more surface-mounted, light emitting diodes (LEDs), located at each imager to uniformly illuminate the symbol 28.

A controller 40 or programmed microprocessor is mounted in the workstation 10 and is operatively connected to the imagers 32, 36 and the illuminators 32A, 32B, 36A, 36B for energizing the illuminators to illuminate the subfields of view, and for processing the captured illumination light in at least one of the subfields of view to read the illuminated symbol 28, and to decode the symbol. The controller 40 sends command signals to the illuminators 32A, 32B, 36A, 36B to pulse the LEDs for a short time period of about 200 microseconds or less, and energizes the imagers 32, 36 to collect light from the symbol 28 only during said time period, also known as the exposure time period. By acquiring a symbol image during this brief time period, the image of the symbol 28 is not excessively blurred even in the presence of relative motion between the imagers and the symbol. A typical array needs about 11 to 33 milliseconds to acquire the entire symbol image and operates at a frame rate of about 30 to 90 frames per second. The array may have on the order of one million addressable sensors. Upon a successful decode, the controller 40 typically energizes an auditory annunciator, e.g., a beeper, and/or a visual indicator, such as a light, to alert the clerk 24 that the symbol 28 has been successfully decoded.

In use, a user, such as the clerk 24 working at a supermarket checkout counter 30, or the customer 20 in a self-checkout stand, processes the product 26 bearing the UPC symbol 28 thereon past the windows 12, 16 by swiping the product 26 across the windows 12, 16, or by presenting and momentarily holding the product 26 at the windows 12, 16, before passing the product 26 to a bagging area 64 that is located at the opposite side of the workstation 10. The symbol 28 may located on any of the top, bottom, right, left, front and rear, sides of the product 26, and at least one of the imagers 32, 36 will capture the illumination light reflected, scattered, or otherwise returning from the symbol 28 through the windows 12, 16. All six of the subfields pass through the windows 12, 16 along different intersecting directions to read different sides of the product 26. As shown in FIG. 3, the six subfields substantially fully occupy the scan zone.

In accordance with this disclosure, to reduce or prevent "sweethearting" losses, a camera module 50 (see FIG. 3-5) is selectively mounted in the housing away from the imagers 32, 36. The camera module 50 is operative for capturing an image of the clerk 24 (or the customer 20 in a self-checkout workstation) through the upright window 16 over a camera angle of view 50B, 50C (FIG. 4) having a central optical axis 50A pointing generally downwardly toward the counter 30. The camera angle of view 50B, 50C is relatively wide and larger than about 15 degrees by 30 degrees, as compared to each subfield of the imagers in order to take a picture of the clerk 24, especially the clerk's hands, in a single image. Although the optical axis 50A at the center of the camera angle of view is illustrated as preferably extending downwardly, it could also be raised to lie in a range of aiming angles extending either along the horizontal direction, or even upwardly to an upper angle of about plus 15 degrees above the horizontal direction. Thus, the camera module 50 is aimed and designed to take a clear, focused picture of the clerk 24. The controller 40 is operatively connected to, and controls, the camera module 50, and independently processes the captured image of the illuminated symbol 28 and the captured image of the clerk 24.

As described above, the controller 40 energizes and pulses the illuminating LEDs to illuminate the symbol 28 with illumination light pulses during illumination or exposure time periods that are spaced apart by time intervals from each other. The controller 40 deenergizes and does not pulse the illuminating LEDs during the time intervals so that no illumination light is emitted during the time intervals. The controller 40 controls the camera module 50 to capture the image of the clerk 24 only during these time intervals with no illumination light. Thus, the camera module 50 captures the image of the clerk 24 using only ambient light, and there is no bright, pulsed illumination light directed to the clerk 24, which would otherwise be highly objectionable, especially when repeated frequently over the course of a workday.

The camera module 50 may operate continuously and be free-running, or the controller 40 can controls the camera module 50 to capture the image of the clerk 24 only during the time intervals after a predetermined number of illumination time periods have elapsed. For example, the camera module 50 can be turned on after every five or so illumination time periods have passed. Alternatively, a manual actuator 52 is provided on the housing, which, when depressed, manually deactivates the illuminating LEDs, and concomitantly actuates the camera module 50 to capture the image of the clerk 24.

The camera module 50 is field-installable so that the workstation is field-upgradeable in situ at a retailer's venue whenever a retailer wishes to add the surveillance capability to the workstation. As best shown in FIG. 5, the tower 18 is removable, and the camera module 50 is mounted inside the housing after removal of the tower 18. The camera module 50 includes a printed circuit board 54, a camera 56 on the board 54, and a transmitter 58 on the board 54 for wirelessly transmitting the captured image of the clerk 24 to the remote host 68.

Figure 6:
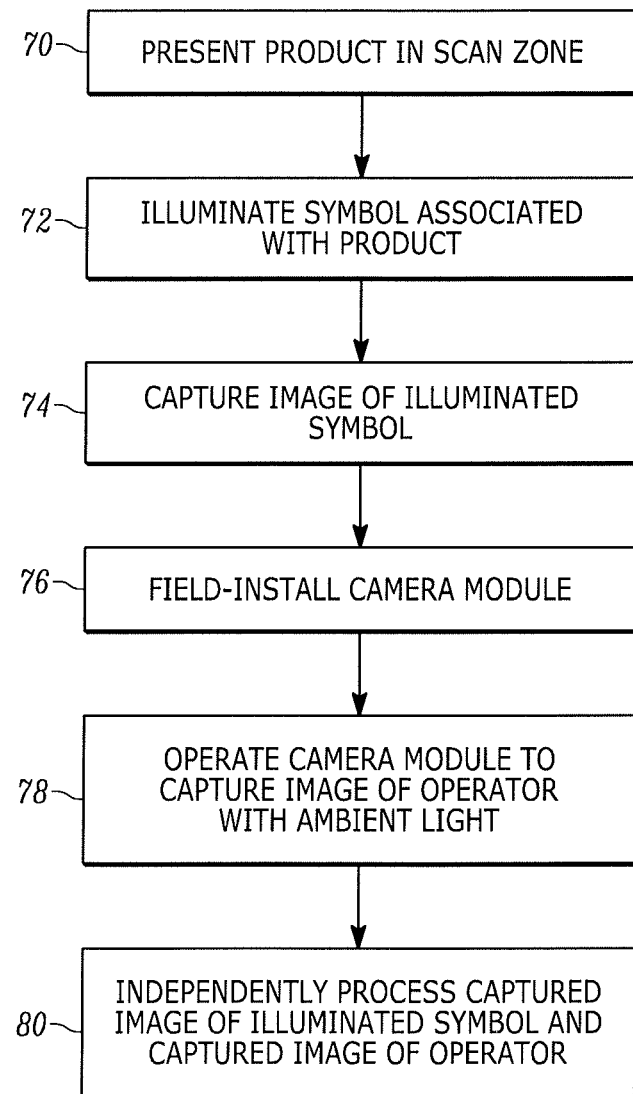
FIG. 6 is a flow chart depicting the steps performed during operator surveillance in accordance with this disclosure.

The method of this disclosure is performed, as shown in the flow chart of FIG. 6, by presenting for processing, by the clerk 24, the product 26 in a scan zone faced by the upright window 16 of the workstation 10 (step 70), by illuminating the symbol 28 associated with the product 26 in the scan zone (step 72), by capturing an image of the illuminated symbol 28 over a field of view of a solid-state imager having an array of image sensors (step 74), by selectively mounting the field-installable, camera module 50 in the workstation 10 away from the imager (step 76), by operating the camera module 50 to capture an image of the clerk 24 through the upright window 16 (step 78), and by independently processing the captured image of the illuminated symbol 28 and the captured image of the clerk 24 (step 80).

In the foregoing specification, specific embodiments have been described. However, one of ordinary skill in the art appreciates that various modifications and changes can be made without departing from the scope of the invention as set forth in the claims below. For example, the workstation need not be a dual window, bioptical workstation, but could be a single window workstation, such as a vertical slot scanner. In another variation, rather than taking a picture of the clerk 24, the camera module 50 could be aimed at a different target, such as a document, e.g., a prescription, a driver's license, a receipt, etc., placed in the scan zone. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A barcode reader comprising:
   a housing having a window located in a plane, the window facing a scan zone configured to receive a product presented by an operator;
   an illuminating assembly supported by the housing, and configured to illuminate, during illumination time periods, a symbol associated with the product in the scan zone, wherein the illumination time periods are spaced apart by time intervals;
   an imager supported by the housing and configured to capture a first image of the illuminated symbol, the imager having an array of image sensors configured to receive return illumination light from the illuminated symbol passing through the window to the imager;
   a removable camera selectively mounted in the housing separate from the imager, and configured to capture a second image through the window; and
   a controller configured to:
      coordinate timing of the imager and the camera; and
      independently process the first image and the second image.

2. The barcode reader of claim 1, wherein the controller is configured to coordinate the timing of the imager and the camera by controlling the imager to capture the first image during one of the illumination periods and controlling the camera to capture the second image during one of the time intervals.

3. The barcode reader of claim 1, further comprising an optical assembly configured to split a field of view of the imager into a plurality of intersecting subfields of view.

4. The barcode reader of claim 1, wherein:
   the controller is configured to control the illuminating assembly to illuminate the symbol with illumination light during the illumination time periods;
   no illumination light is generated by the illuminating assembly during the time intervals; and
   the controller is configured to control the camera to capture the second image only during the time intervals with no illumination light.

5. The barcode reader of claim 4, wherein the controller is configured to control the camera to capture the second image only during the time intervals after a predetermined number of the illumination time periods have elapsed.

6. The barcode reader of claim 4, wherein the camera is configured to capture the second image using only ambient light.

7. The barcode reader of claim 1, further comprising a manual actuator configured to, when engaged, deactivate the illuminating assembly and concomitantly actuate the camera to capture the second image.

8. The barcode reader of claim 3, wherein the camera has a first angle of view greater than a second angle of view of individual ones of the subfields of view.

9. The barcode reader of claim 1, wherein the housing includes a removable housing portion, and the camera is configured to be mounted inside the housing after removal of the housing portion.

10. The barcode reader of claim 1, wherein the camera is mounted on a printed circuit board, and a transmitter on the printed circuit board is configured to transmit the second image to a remote host.

* * * * *